J. T. RANDALL.
Coffee Cleaner.

No. 102,591. Patented May 3, 1870.

WITNESSES.
A. Bailey
Wm. H. McCabe

John T. Randall
by his Attorney
A. Pollok

UNITED STATES PATENT OFFICE.

JOHN T. RANDALL, OF BALTIMORE, MARYLAND, ASSIGNOR TO F. W. ELDER & CO., OF SAME PLACE.

IMPROVEMENT IN APPARATUS FOR POLISHING COFFEE, &c.

Specification forming part of Letters Patent No. 102,591, dated May 3, 1870.

*To all whom it may concern:*

Be it known that I, JOHN THOMAS RANDALL, of the city and county of Baltimore, and State of Maryland, have invented certain new and useful Improvements in Apparatus for Cleaning and Polishing Coffee, Rice, and other Grain; and I hereby declare the following to be a full, clear, and exact description of the same, reference being had to the accompanying drawings, in which—

Figure 1:
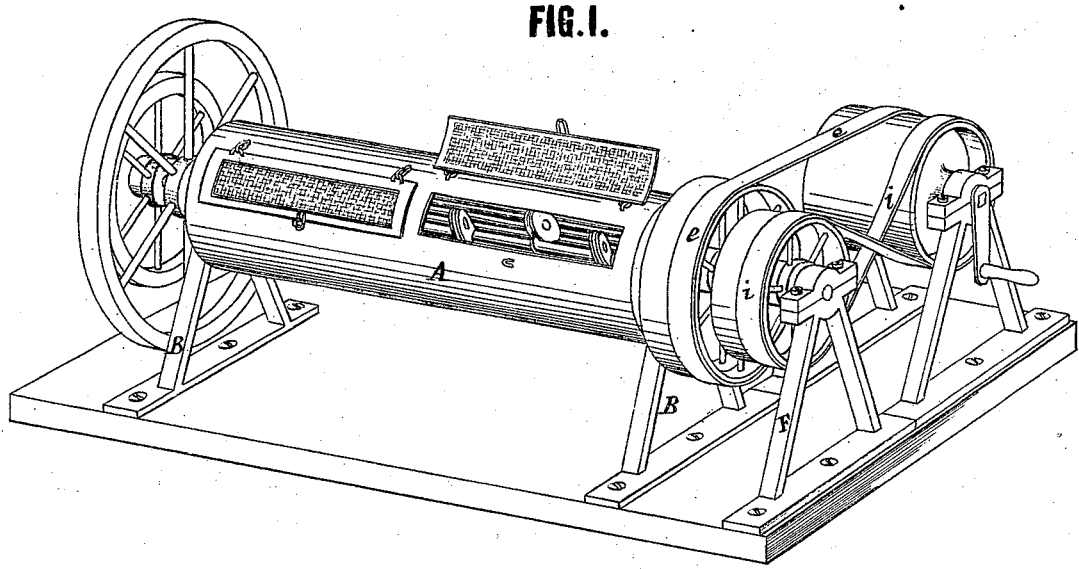
Figure 2:
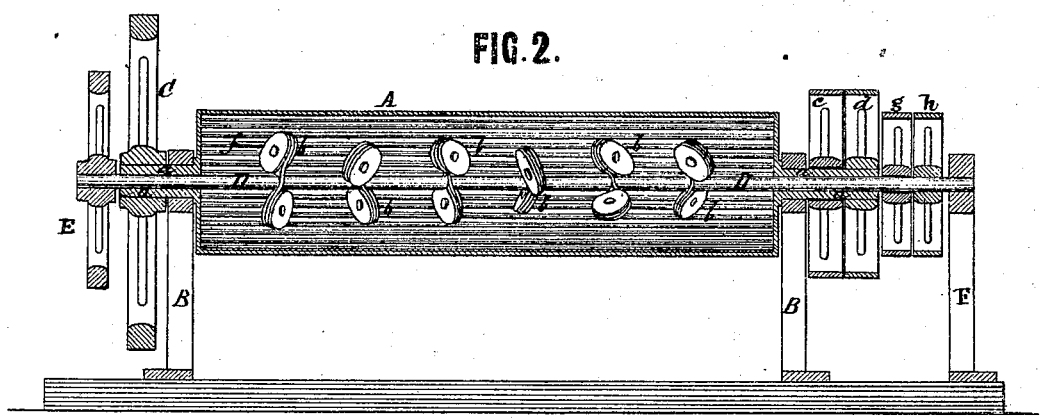
Figure 3:
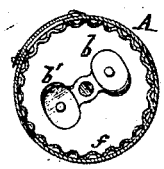

Figure 1 is a perspective view of a machine made in accordance with my invention. Fig. 2 is a longitudinal vertical central section of the same. Fig. 3 is a transverse vertical section of the same.

The apparatus in which my invention is embraced consists of an internally-corrugated cylinder provided with hollow journals, in combination with a shaft extending through the cylinder and its journals, and carrying a series of beater-arms inclined in different directions, as hereinafter described, so as to cause the thorough mixture and beating of the grain. The cylinder and shaft are caused to revolve in opposite directions, thereby subjecting the coffee to a much more energetic treatment than would otherwise be practicable, and producing a friction and heat which will cause the speedy cleaning and polishing of the grains.

In the drawings, A represents the cylinder, provided at its ends with hollow journals $a$, mounted in suitable bearings on uprights or frames B. Upon one of the hollow journals fast and loose pulleys $c$ $d$ are mounted, connected with the driving-pulley or shafting by a belt, $e$, which may be shifted from the fast to the loose pulley in the usual way. Upon the other journal is mounted a balance or fly wheel, C. The interior of the cylinder is formed with longitudinal ribs or corrugations $f$, made in any suitable manner—as, for instance, by placing in the cylinder a ribbed wooden lining. The cylinder is, as usual, provided with gage-doors for allowing the dust to escape and the grain to be taken out. A shaft, D, extends centrally or axially through the cylinder, its hollow journals projecting beyond the latter, so as to allow one end to receive the fast and loose pulleys $g$ $h$ and the other the balance or fly wheel E. The end of the shaft projecting beyond the pulley is mounted in bearings in a standard or frame, F. The pulleys $g$ $h$ are connected with the driving-pulley or shafting by a crossed belt, $i$, which thus causes the shaft to rotate in a direction opposite to that in which the cylinder revolves.

Upon the shaft is mounted a series of radial beaters, $b$, arranged in pairs on the shaft, with their faces turned or inclined in opposite directions, as shown more clearly in Fig. 3 at $b$ $b'$, so that when the shaft is in revolution the one beater, $b$, will tend to move the grain toward one end of the cylinder, and the other beater, $b'$, will, on the contrary, tend to move it toward the opposite end, thus keeping up a constant movement and agitation of the grain, all of which will thus be surely subjected to the action of the beaters. The beaters are covered with leather or other suitable material, and are of such length as to approach quite near to the corrugated lining of the cylinder.

A machine thus constructed and arranged will perform its work more satisfactorily and in less time than has been practicable heretofore. The movements of the shaft and cylinder in opposite directions, in conjunction with the peculiarly-inclined beaters and the corrugated or rubbing surface of the cylinder, cause such an agitation of the grain and such a friction as to thoroughly perform the cleaning and polishing operation in a very short time. Indeed, the friction is so great as to render unnecessary the application of heat to the cylinder, which has heretofore been found quite indispensable. The apparatus is simple, and can be easily and cheaply made. Any suitable gearing for moving the shaft and cylinder in opposite directions may be used.

Having now described my invention and the manner in which the same is or may be carried into effect, I would state that I do not claim separately any of the parts herein described; but

What I claim, and desire to secure by Letters Patent, is—

The combination of the internally-corrugated cylinder A and its hollow journals, the beater-shaft D, extending longitudinally through said cylinder and journals, and the series of peculiarly-inclined beater-arms b, mounted upon said shaft, substantially as specified, the said cylinder and shaft being revolved in opposite directions, and the whole constructed and arranged for joint operation, as shown and set forth.

In testimony whereof I have signed my name to this specification before two subscribing witnesses.

JNO. T. RANDALL.

Witnesses:
M. BAILEY,
A. POLLOK.